Feb. 20, 1968     R. J. HARRIS     3,369,789
ADJUSTABLE SUPPORTS
Filed Jan. 5, 1966
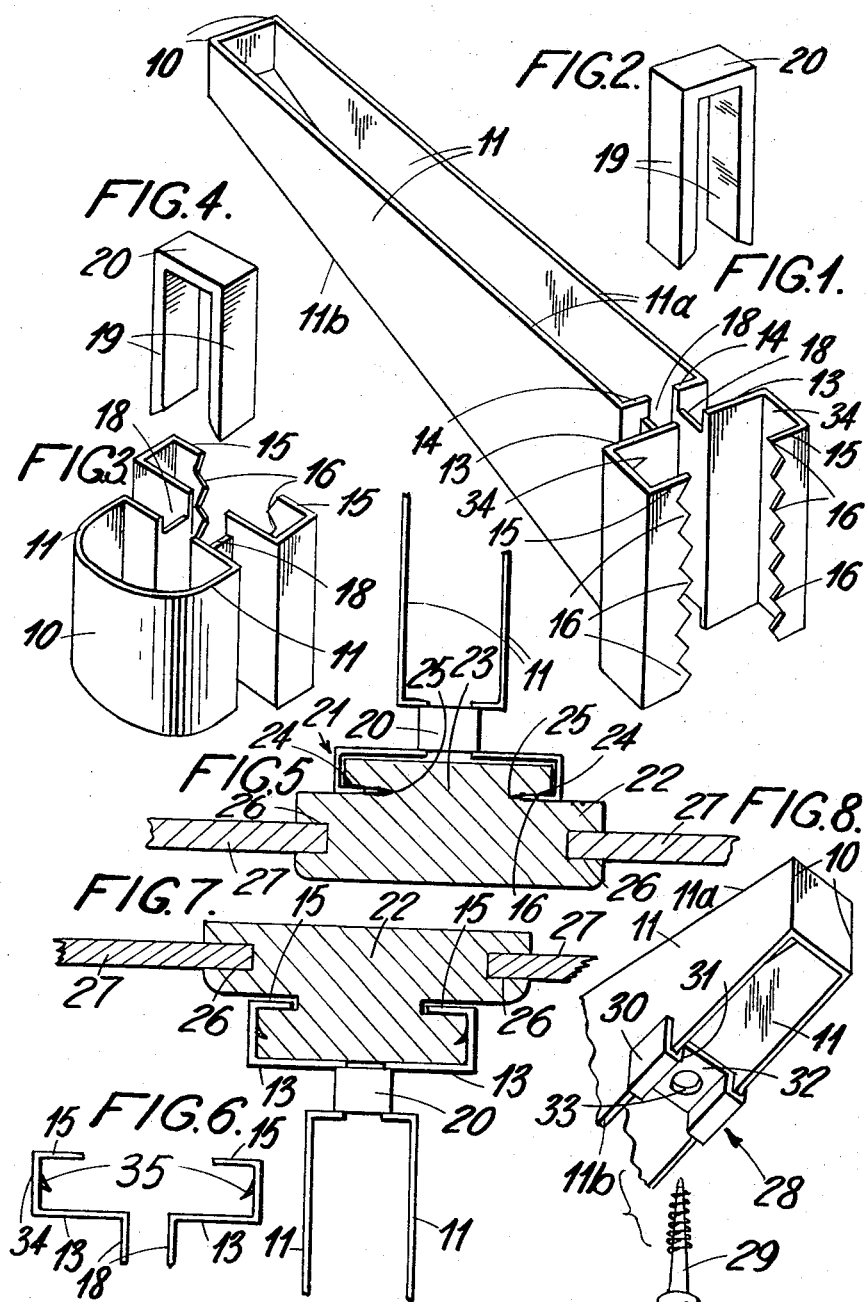
Inventor
Ronald John Harris
By Cushman, Darby & Cushman
Attorneys United States Patent Office 3,369,789
Patented Feb. 20, 1968

3,369,789
ADJUSTABLE SUPPORTS
Ronald John Harris, Dunstable, England, assignor to Deckvale Limited, Coventry, England, a British company
Filed Jan. 5, 1966, Ser. No. 518,947
Claims priority, application Great Britain, Jan. 6, 1965, 662/65
12 Claims. (Cl. 248—245)

This invention relates to adjustable supports particularly for shelving and of the kind comprising uprights on which brackets are slidably mounted and resiliently held. An object of the invention is to provide a simple arrangement which is cheap to manufacture. According to this invention an adjustable support of the kind referred to is characterised in that said upright and bracket are provided with interengaging slide and slideway, and said bracket is provided with one or more projections resiliently engageable with a part of the upright. The latter being so formed that the projections resiliently engage cooperating grooves in said upright and maintain a fixed relationship therewith.

In one form of the invention at least one side of the upright is provided with a groove and the bracket is formed with a slide having parts which overlie the sides of the upright at least one of which slide parts is provided with projections which extend into said groove and which overlying parts are arranged to spring towards one another when the projections engage said groove and means are provided for maintaining said engagement.

The aforesaid projections may be formed on the edge of a flange extending laterally of said part which overlaps the side of the upright.

In an alternative arrangement the projections may be formed on a face of an overlying part of the slide so as to engage the groove on a side face of the upright.

In any of the arrangements referred to above grooves may be formed on both sides of an upright and projections are formed on both sides of the slide which overlap the sides of the upright.

The sides of the upright may be stepped and, in the case where the projections are formed on inwardly directed flanges of the slide, said grooves are formed where the narrower portions of the uprights join the wider portions.

The sides of the uprights are stepped and said grooves are formed on the wider portions of the uprights.

Preferably the bracket is formed from metal and the sides of said upright are formed from a comparatively soft material enabling the projections to dig into it. For example, the sides of the upright may be formed from wood or from comparatively soft plastics.

The bracket may be formed from a resilient metal strip which is bent to provide spaced limbs, the free extremities of which are also bent to provide said overlying parts and said flanges. With this arrangement the limbs may be spread apart to release the aforesaid grip on the upright enabling the bracket to be moved along it to a required position.

The width of said groove or each said groove or part thereof may be less than the thickness of the flange which is to engage it, thereby providing a firm grip between them when the flange is pressed into the groove.

The resilience of the metal may be such as to constitute the means for maintaining said grip. Alternatively or additionally said means for maintaining said grip may comprise a rigid removable U-piece the limbs of which are arranged to straddle the limbs of the bracket.

The limbs of the U-piece may converge towards their joined ends whereby in pushing the U-piece into position the limbs of the brackets are pressed towards one another.

As viewed in side elevation the limbs of the bracket when in position on the upright are so shaped that one edge of each limb is horizontally disposed, whereas the other edge of each limb converges towards the extremity of the horizontal edge as it extends away from said slide portion.

In the case where the bracket is formed from metal strip which is bent to provide spaced limbs there may be provided a clip which engages the lower edges of the limbs and is provided with a hole through which is passed a securing screw for engagement with a supporting shelf or the like which rests on the upper edges of the limbs.

In any of the arrangements referred to above the aforesaid uprights may comprise parts of a panel.

The following is a more detailed description of one form of the invention reference being made to the accompanying drawings in which:

FIGURE 1 is a perspective view of the bracket;
FIGURE 2 is a perspective view of a clip for use with the bracket;
FIGURE 3 is a perspective view of an alternative form of bracket;
FIGURE 4 is a perspective view of a clip for use with the bracket of FIGURE 3;
FIGURE 5 is a section through an upright and associated panel showing the bracket of FIGURE 1 in position;
FIGURE 6 is a plan through the outer extremity of an alternative form of bracket;
FIGURE 7 is a similar view to FIGURE 5 showing the bracket of FIGURE 6 in position on an upright;
FIGURE 8 is a perspective view of an end portion of a bracket showing a clip and screw by means of which a shelf may be secured thereto.

Referring to FIGURES 1 and 2 the bracket is formed from a metal strip which is bent at 10 to provide limbs 11 each of which towards its extremity is bent to form a U having one limb 13 longer than the other limb 14, and which limb 13 extends laterally from the strip. The outer ends of these limbs 13 are bent also to form a U having an inwardly directed limb or flange 15. The edges of these two limbs or flanges 15 are provided with projections 16. The bottom 17 of each of the first said U-shaped portion is cut away at 18 and these cut away portions may be straddled by the limbs 19 of a rigid U-shaped clip illustrated in FIGURE 2, the bottom 20 of the U-shaped clip being accommodated in the cut away portions. The limbs 19 may converge as they extend towards the bottom U so that by pressing the U piece into position the flanges are sprung together. Alternatively the limbs 11 may be drawn together by a clamping screw which extends through holes in the bottoms of the U shaped parts 13 and 14 of the limbs and receive a clamping nut.

The edges 11a of the limbs 11 are arranged to extend at right angles to the plane in which the parts 14 are disposed whereas the edges 11b are arranged to extend at an angle to said plane. The bracket can be used either way up and in one way the edges 11a will be horizontal whereas in the other way up the edges 11b will be inclined to the horizontal; thus if the brackets are used for supporting a shelf, the shelves may be either horizontally disposed or inclined to the horizontal.

However the edges 11a and 11b may be parallel to one another if required.

An upright 21 formed from wood or suitable plastics is shown in FIGURE 5 with which the bracket of FIGURE 1 is employed, has a base portion 22 and a narrower front portion 23, and where these portions join one another on each side of the upright there are formed taper sided grooves which extend towards one another, the outer end of each groove 24 being wider than the inner portions 25a.

The width of the portion 23 is slightly less than the width between the bottom portions 25 of the outer U-shaped portions 13, 15, shown in FIGURE 1 and the overall depth of each groove 24, 25 is preferably greater than the overall length of the flange 15 and projections 16.

The base portion 22 may either be secured direct to a wall or the side edges of the base portion may be formed with grooves 26 for accommodating panelling 27 associated with a wall.

In assembling the brackets on the upright the flanges and projections may be slid on to the upright so that they enter the grooves 24, 25 the projections initially lying within a wider portion of the groove. The limbs 11 are then pressed together so that the projections dig into the smaller part of the grooves whereafter the limbs 11 are engaged by the U-shaped clip 19, 20.

An abbreviated form of bracket and associated clip are shown in FIGURES 3 and 4 in which case the limbs 11 are foreshortened and joined by a curved bent portion 10 otherwise the bracket and its assemblage in an upright are as described with reference to FIGURES 1, 2 and 5. Such a bracket may be employed for providing a support on which articles can be suspended.

FIGURE 6 shows that end of an alternative form of bracket which is engageable with an upright and in this construction instead of the flanges 15 being provided with projections 16 these projections are formed by upsetting the strip metal on the parts 34 between the flanges 15 and parts 13 so as to form projections 35 and the uprights 21 instead of being arranged with the wide base portions 22 adjacent the wall are disposed so that the narrower portions 23 take up that position and in the case where panelling is provided it engages grooves in the sides of the narrower portion. The sides of the wider portions 22 are provided with grooves similar to the grooves 24–25 into which the teeth 35 may be pressed. In this instance the width of the sides of the wider portion 22 corresponds to the distance between the part 15 and the parts 13.

FIGURE 7 shows the extremity of the bracket and a clip 28 is in association with a screw 29 for securing a shelf to the top edges 11a of the brackets. As will be seen the clip is formed from strip metal opposite ends of which are bent into U-shape so that the limbs 30, 31 at each end grip the lower edges 11b of the limbs 11. The part 32 between the U-shaped limbs is provided with a hole 33 through which the screw 29 can be inserted and engaged with the underside of a shelf supported by the bracket.

It will be appreciated that various modifications may be made to details of construction without departing from the scope of the invention for example, one of the aforementioned flanges 15 need not be provided with projections and may slide in a uniform width groove on one side of the upright.

The projections 16 might be ratchet-shaped so as to tend to dig into the wood on the upright when the bracket is loaded.

The aforesaid U-shaped piece may be dispensed with and the resilience of the strip metal from which said bracket is formed may be strong enough to maintain the projection 16 in engagement with the walls of the groove.

I claim:

1. In combination: an upright, said upright having sides composed of a relatively soft material, said sides having receiving means adapted to engage a bracket element, and a bracket element, said bracket element comprising two integrally formed sides joined at one end so as to form a generally U-shaped member with an open end and sides resiliently movable toward or away from one another, each side of said generally U-shaped member having means to receive a clip means whereby said sides may be clipped and held in a fixed position relative to one another, said bracket element further having two generally opposed upright gripping means affixed at substantially right angles to each of said two resilient sides respectively whereby when said bracket is positioned along said upright, said upright gripping means, being of less soft material than the sides of said upright, may be pressed so that the receiving means of said sides of said upright engage the bracket element and said gripping means of relatively less soft material dig into the relatively softer sides of said upright, and a clip adapted to engage and retain said two resilient sides in a fixed position relative to one another, whereby said upright gripping means may be resiliently held in digging contact with said upright.

2. A combination as claimed in claim 1 wherein said receiving means in said sides of said upright is a groove.

3. A combination as claimed in claim 2 wherein said gripping means is generally U-shaped whereby when one side of the U-shaped means is engaged by said groove the other side is substantially flush with the face of said upright.

4. A combination as claimed in claim 3 wherein the sides of said upright are stepped and said grooves are formed where the narrower portions of the steps in the groove join the wider portions.

5. A combination as claimed in claim 3 wherein the sides of the upright are stepped and said grooves are formed in the wider portion of the upright.

6. A combination as claimed in claim 1 wherein said relative soft material is a cellulose material and said relative less soft material is metal.

7. A combination as claimed in claim 2 wherein said groove is of less width than the gripping means.

8. A combination according to claim 1 wherein said clip means is a separate, removable, rigid U-shaped member, the limbs of which are arranged to straddle said two resilient sides of said bracket element.

9. A combination as claimed in claim 1 wherein said clip means has U-shaped ends to engage the under edges of the sides of the bracket and which clip is provided with a hole through which extends a clamping screw for engagement with a shelf which is supported by the upper sides of the bracket.

10. A combination as claimed in claim 1 wherein said upright forms part of a panelling.

11. In combination: an upright, said upright having sides composed of a relatively soft material, said sides having receiving means adapted to engage a bracket element, and a bracket element, said bracket element comprising two integrally formed sides joined at one end so as to form a generally U-shaped member with an open end and sides resiliently movable toward or away from one another, each side of said generally U-shaped member having means to receive a clip means whereby said sides may be clipped and held in a fixed position relative to one another, said bracket element further having two generally opposed clamping means affixed at substantially right angles to each of said two resilient sides respectively, said clamping means having projections therefrom, whereby when said bracket is positioned along said upright, said clamping means may be pressed so that the receiving means of said sides of said upright engage the clamping means, and said projections of relatively less soft material dig into the relatively softer sides of said upright, and a clip adapted to engage and retain said two resilient sides in a fixed position relative to one another, whereby said projections of the clamping means may be resiliently held in digging contact with said upright.

12. A combination as claimed in claim 11 wherein said receiving means is a groove, said clamping means is generally U-shaped, said relatively soft material is cellulose and said relatively less soft material is metal.

References Cited

UNITED STATES PATENTS

| | | | |
|---|---|---|---|
| 723,677 | 3/1903 | Knade | 248—245 |
| 844,367 | 2/1907 | Knape | 248—245 |
| 2,703,692 | 3/1955 | Felix | 248—244 |
| 3,007,665 | 11/1961 | Derr | 248—226 |
| 3,015,468 | 1/1962 | Mooney | 248—245 |
| 3,090,588 | 5/1963 | Monette | 248—216 |
| 3,136,520 | 6/1964 | Reiss | 248—243 |

FOREIGN PATENTS 846,928   9/1960   Great Britain.

ROY D. FRAZIER, *Primary Examiner.*

W. D. LOULAN, *Assistant Examiner.*